Dec. 13, 1955 L. SMALL ET AL 2,726,540
HARDNESS TESTING APPARATUS
Filed Dec. 6, 1951 2 Sheets-Sheet 1
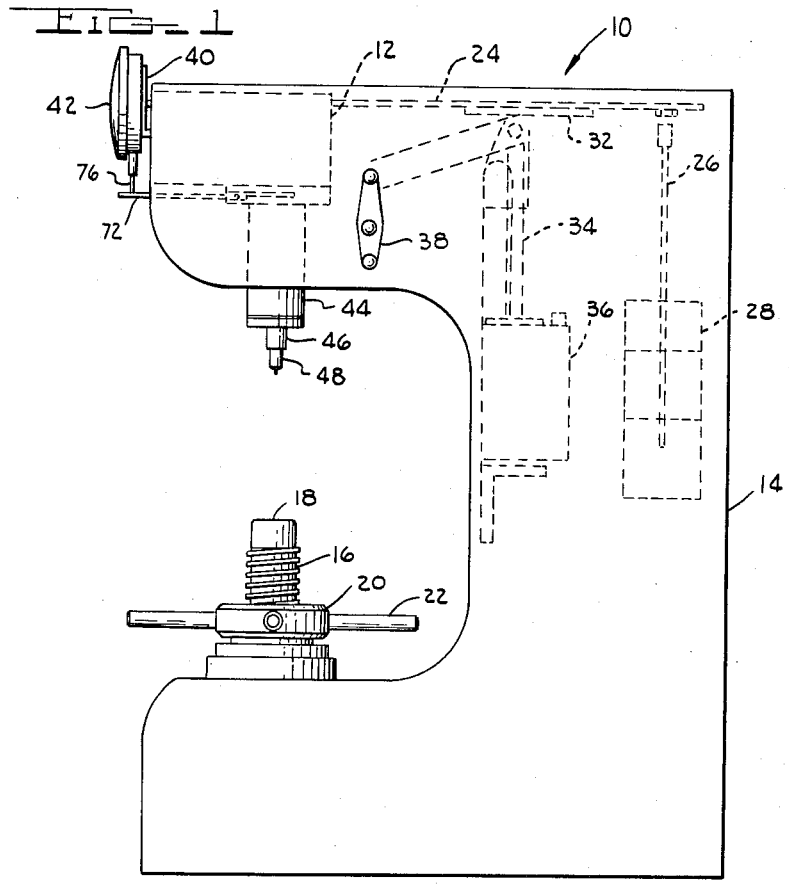
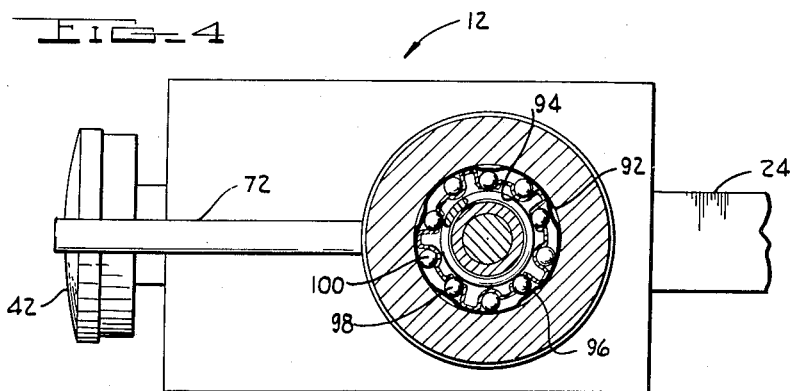
INVENTOR.
LOUIS SMALL
MICHAEL G. ANTONIK
BY
ATTORNEY

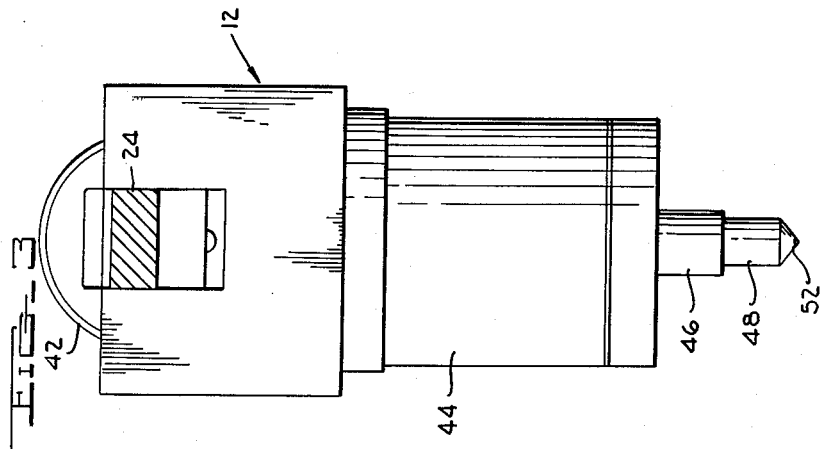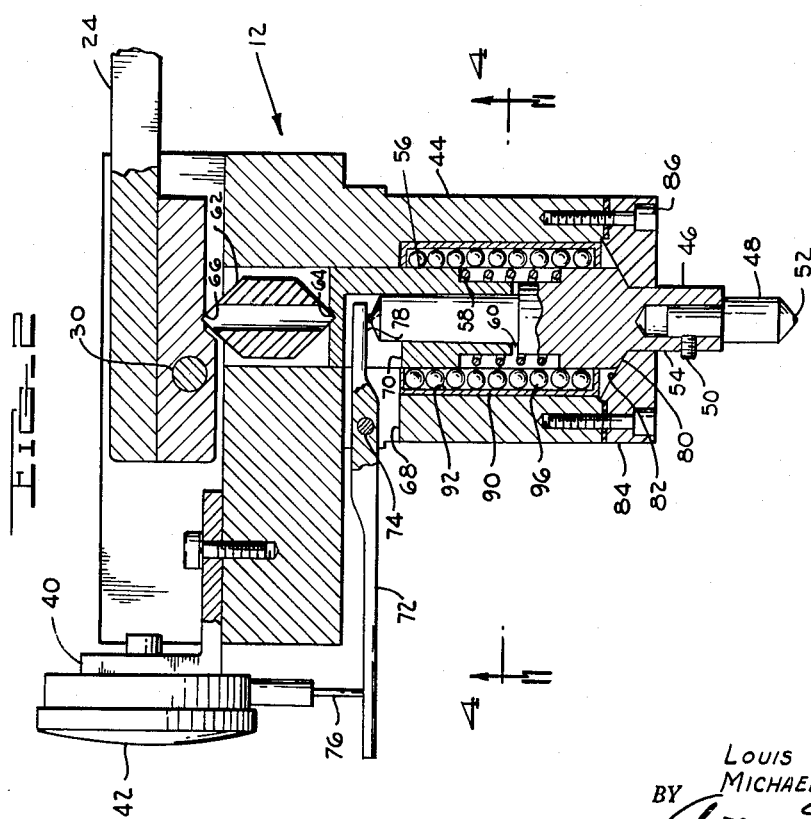

United States Patent Office 2,726,540
Patented Dec. 13, 1955

2,726,540
HARDNESS TESTING APPARATUS

Louis Small and Michael G. Antonik, Detroit, Mich., assignors to Service Diamond Tool Company, Ferndale, Mich., a corporation of Michigan Application December 6, 1951, Serial No. 260,226

2 Claims. (Cl. 73—83)

The present invention relates to hardness testing machines for "Rockwell" testing and more particularly to improvements in the indicator head units of such machines.

In hardness testing machines of this general character which have heretofore been used, considerable difficulty has been encountered in obtaining uniformly accurate results because of the accumulation of particles of dust or rust between the housing and the spindle on which the penetrator is mounted. Inaccurate results also have been obtained because of the excessive friction and resultant wear that occurs between these parts. When these machines are in regular use, they are often found to lose their accuracy from their original setting in a matter of weeks or relatively few months. This necessitates constant checking and overhauling, which it is readily understandable, is undersirable.

Various efforts have been made throughout the industry to remedy this problem. In some instances units have been constructed in which the spindle is spaced from the supporting housing when the major load is applied, but this is found to be impractical because in such an arrangement the diamond tip of the penetrator does not always follow a vertical path in penetrating the test specimen, but instead follows the path of least resistance in penetrating the specimen. This results in the penetrator being deflected off its intended course and the indicator gauge does not register a true reading of the hardness of the specimen.

Other units have been constructed employing various bearing arrangements for the spindle, but in each instance the units have not overcome the basic problem of discovering how to retain the machine in accurate working condition for a prolonged period. This has been accomplished in the present invention in which it is the principal object to provide a hardness testing machine having a substantially friction free guide arrangement for the spindle which will retain said spindle in proper axial alignment during operation of the hardness tester and particularly when the penetrator is being applied against the specimen.

It is another object of the present invention to provide a head unit for a hardness testing machine of the foregoing character wherein a longitudinal bearing is utilized between the spindle and the supporting sleeve therefor for providing the substantially friction free guide arrangement.

It is still another object of the present invention to provide a head unit of the foregoing character in which the longitudinal bearing comprises a plurality of columns of balls surrounding the spindle and adapted to circulate in oblong circuits so as to effect the optimum frictionless axial movement of the spindle while preventing deflection of the penetrator carried on the distal end of the spindle.

Other objects of this invention will appear in the following description and appended claims, reference being had to the accompanying drawings forming a part of this specification wherein like reference characters designate corresponding parts in the several views.

In the drawings:

Fig. 1 is a side elevation of a hardness tester embodying the present invention, some parts of the tester being shown by hidden edge lines;

Fig. 2 is a fragmentary sectional view drawn to an enlarged scale of the head unit utilized in the hardness tester illustrated in Fig. 1;

Fig. 3 is a rear elevation of the head unit shown in Fig. 2; and

Fig. 4 is a section taken on lines 4—4 of Fig. 2 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings and first to Fig. 1, the hardness tester 10 of the "Rockwell" type can be seen in which the head unit 12 embodying one form of the present invention is mounted. The hardness tester 10 has a conventional frame 14 which has a lead screw 16 threadedly connected thereto. A support 18 is provided at the upper end of the lead screw 16 for carrying the specimen (not shown) which is to be tested.

The lead screw 16 is moved vertically upward or downward, as desired, by rotating in the proper direction the lead nut 20 which has four lead nut handles 22 to facilitate carrying out this operation. When a specimen (not shown) is to be tested it is placed on the support 18 and the lead screw 20 is elevated to the level necessary to carry out the test which will be more fully described hereinafter.

With the exception of the head unit 12, the elements of the hardness tester 10 shown in Fig. 1 are old and well known in the art. In the conventional manner, the beam 24 has a weight hanger 26 pivotally connected to its one end and which hanger 26 carries a plurality of weights as at 28. The other end of the beam 24 extends into the head unit 12, see Fig. 2, where it is pivotally mounted by the pin 30 and is adapted to apply the major load against the specimen as will be explained subsequently. The beam 24 is also supported at the wear plate 32 by the rod 34 which extends down to the dash pot structure 36. A handle 38 is provided which when rotated will apply the major load upon the specimen (not shown) and the dash pot structure 36. Mounted on the frame 14 by the bracket 40 is the indicator gauge 42 which is also of a conventional type.

Referring now to Figs. 2, 3, and 4, the details of the head unit 12 can be seen. It includes an outer casing or sleeve 44 within which is reciprocally mounted a plunger assembly 46, the lower end of which includes the penetrator 48 which is held in place by the set screw 50. The penetrator can be of any standard type and preferably has a diamond tip as shown at 52.

The plunger assembly 46 also includes the lower spindle 54 and the upper spindle 56 which are telescopically fitted together, and they are biased apart by the coil spring 58 when no load is applied on said spring 58 so as to provide the relatively narrow space at 60 for a purpose to be explained later.

A knife edge member 62 has its lower edge in the groove 64 on the upper surface of the upper spindle 56 and its upper edge in the groove 66 formed in the lower side of the beam 24. As can be seen, the knife edge member 62 is spaced from sleeve 44 so that it will not frictionally resist movement of the beam 24 and plunger assembly 46 when the penetrator 52 is being applied against a test specimen (not shown).

The sleeve 44 and the upper spindle 56 have aligned slots 68 and 70 respectively through which an indicator lever 72 projects, and such indicator lever 72 is pivotally mounted in sleeve 44 at 74. The indicator lever 72 has its outer end in engagement with the movable indicator gauge element 76 and its inner end in engagement with the upper end of the lower spindle 54 as at 78. By virtue of this construction, movements of the penetrator 48 will be transmitted through the lower and upper spindles 54 and 56 to the indicator lever 72 and from there to the indicator gauge 42.

As is shown in Fig. 2, the lower spindle 54 has a beveled annular shoulder 80 which is adapted to seat in the converging opening 82 formed in the cap member 84. The latter is attached to the sleeve 44 by a plurality of screws as at 86 and serves to retain the plunger assembly within the sleeve 44 and to oppose the biasing action of the coil spring 58. As will be understood, the lower spindle 54 will be seated in the converging opening 82 only when the hardness tester 10 is not in use. When a specimen (not shown) is to be tested, a minor load is first applied thereto by raising the lead screw 16 with the specimen supported thereon until the latter engages the penetrator 48. The lead screw 16 is then raised a small increment further until the lower spindle 54 is raised sufficiently to close the gap 60, previously described, and also to raise the upper spindle 56 to actuate the indicator gauge a prescribed amount.

This operation constitutes applying the minor load to the specimen (not shown). Thereafter, the major load is applied by turning handle 38 so that the weights 28 are loaded by the beam 24 onto the knife edge member 62 and thus onto the specimen (not shown) which is located under the penetrator 48. As can now be understood, the penetrator 48 will be depressed into the specimen, since the beveled annular shoulder 80 of the plunger assembly 46 is free to be lowered toward the converging opening 82 and the extent of this movement can be determined from the dial of the indicator gauge 42 for ascertaining the hardness of the specimen (not shown).

One of the important features of this head unit 12 is the manner in which the plunger assembly 46 is journaled in the sleeve 44 so as to substantially eliminate frictional impediments of axial movements of the plunger assembly 46. A longitudinal bearing or ball bushing 90 is mounted within the sleeve 44 and between the latter and the plunger assembly 46.

The longitudinal bearing 90 comprises an outer casing or housing 92 and an inner sleeve 94, Fig. 4, between which a plurality of oblong circuits of balls 96 are provided, each of which has the balls in one of its straight sides in bearing contact between the inner surface of the housing 92 and the plunger assembly 46, and the other of its straight sides between the inner surface of the housing 92 and the inner surface of the sleeve 94. An end view of this construction and arrangement is shown in Fig. 4 wherein the column of balls at 98 illustrates one side of the oblong circuit and the column of balls at 100 illustrates the other side of the oblong circuit. Thus, it can be understood that the plunger assembly 46 is rolled freely along on the alternate columns 98 during its axial movements, and these columns 98 maintain the plunger assembly and its penetrator 48 in true axial alignment during movements of the same. The balls in the remainder of each oval circuit including those in alternate columns 100 are free to roll in clearance provided between the housing 92 and the sleeve 94 so that the balls 96 do not restrict axial movements of the plunger assembly 46.

From the foregoing description, it is believed clear that the present invention provides a novel and very efficient hardness tester which will continue to furnish highly accurate results over a prolonged period of use. The head unit is so constructed and arranged that the plunger assembly can be maintained in axial alignment and moved longitudinally with substantially no frictional resistance. This enables accurate results to be obtained because the only impediment to penetration of the test specimen by the penetrator will be the hardness characteristics of said specimen which characteristics will be recorded directly on the dial of the indicator gauge.

It is also believed clear that dust, rust, or the like will not tend to bind the plunger assembly. The longitudinal bearing employed provides a continuous recirculation of balls which are enclosed in a housing so as to be protected against contamination of any form.

Having thus described our invention, we claim:

1. In a hardness testing machine, an indicator head unit comprising a spindle sleeve, an annular head unit cap secured to the lower end of said spindle sleeve, a lower spindle in said sleeve having its lower end projecting through the opening in said cap and having an edge for seating on the latter, the upper portion of said spindle having a reduced diameter to form a shoulder below its upper end, an upper spindle having an axial opening into which the upper end of said lower spindle projects, the lower portion of said upper spindle having a reduced diameter to provide a shoulder above its lower end, a spring mounted between said shoulders for urging the spindles apart so that the lower spindle normally will be seated on said cap and the upper spindle will be floatingly carried on the lower spindle, said sleeve and said upper spindle having aligned slots in communication with the axial opening in the latter, an indicator lever pivotally mounted in the slot in said sleeve and having its one end in contact with the upper end of said lower spindle, the other end of said lever being adapted to actuate an indicator gauge, a ball bushing mounted in said sleeve between the latter and the upper and lower spindles, said ball bushing having a plurality of oblong circuits each of which has the balls in one of its straight sides in bearing contact between the spindles and the inner surface of the ball bushing housing, and a penetrator mounted on the lower end of the lower spindle.

2. In a hardness testing machine, an indicator gauge, an indicator head unit carrying a movable penetrator, a loading beam for applying loads on said penetrator, said head unit comprising a spindle sleeve, an annular head unit cap secured to the lower end of said spindle sleeve, a lower spindle in said sleeve having its lower end projecting through the opening in said cap and having an edge for seating on the latter, the upper portion of said spindle having a reduced diameter to form a shoulder, an upper spindle having an axial opening into which the upper end of said lower spindle projects, the lower portion of said upper spindle having a reduced diameter to form a shoulder, a spring mounted between said shoulders for urging the spindles apart so that the upper spindle will be carried floatingly on the lower spindle and the lower spindle will be seated on said cap, said sleeve and said upper spindle having aligned slots in communication with the axial opening in the latter, an indicator lever pivotally mounted in the slot in said sleeve and having its one end in contact with the upper end of said lower spindle and its other end in contact with an actuating element of said indicator gauge, a longitudinal ball bushing between said sleeve and the spindles permitting free axial movements of the latter, a penetrator mounted on the lower end of the lower spindle, and a knife edge member disposed between said load beam and the upper spindle for applying loads on the latter.

References Cited in the file of this patent

UNITED STATES PATENTS

| 1,516,208 | Rockwell | Nov. 18, 1924 |
| 2,282,904 | Tea | May 12, 1942 |
| 2,321,717 | Wallace | June 15, 1943 |
| 2,360,760 | Clark | Oct. 17, 1944 |
| 2,503,009 | Thomson | Apr. 4, 1950 |
| 2,509,749 | Thomson | May 30, 1950 |
| 2,520,785 | Schlicksupp | Aug. 29, 1950 |
| 2,655,414 | Briney, Jr. | Oct. 13, 1953 |

FOREIGN PATENTS

| 39,264 | Sweden | Aug. 11, 1915 |
| 916,870 | France | Aug. 26, 1946 |